(12) United States Patent
Woodard et al.

(10) Patent No.: US 8,281,019 B1
(45) Date of Patent: *Oct. 2, 2012

(54) METHOD AND SYSTEM FOR SCANNING NETWORK DEVICES

(75) Inventors: Keith Woodard, Norfolk, MA (US); Fernando Trias, Medfield, MA (US)

(73) Assignee: Symantec Corporation, Mountain View, CA (US)

( * ) Notice: Subject to any disclaimer, the term of this patent is extended or adjusted under 35 U.S.C. 154(b) by 816 days.

This patent is subject to a terminal disclaimer.

(21) Appl. No.: 11/862,990

(22) Filed: Sep. 27, 2007

Related U.S. Application Data

(63) Continuation of application No. 10/683,564, filed on Oct. 10, 2003.

(51) Int. Cl.
*G06F 15/16* (2006.01)

(52) U.S. Cl. ........ 709/228; 709/227; 709/220; 709/202; 709/232; 709/200

(58) Field of Classification Search .................. 709/212, 709/218, 224, 229, 227, 220, 202, 232, 228
See application file for complete search history.

(56) References Cited

U.S. PATENT DOCUMENTS

| | | | |
|---|---|---|---|
| 5,675,637 A | 10/1997 | Szlam et al. | |
| 6,049,819 A | 4/2000 | Buckle et al. | |
| 6,058,426 A | 5/2000 | Godwin et al. | |
| 6,108,492 A | 8/2000 | Miyachi | |
| 6,324,656 B1 * | 11/2001 | Gleichauf et al. | 714/37 |
| 6,360,255 B1 * | 3/2002 | McCormack et al. | 709/221 |
| 6,381,640 B1 | 4/2002 | Beck et al. | |
| 6,546,493 B1 | 4/2003 | Magdych et al. | |
| 6,802,009 B1 * | 10/2004 | Godwin | 726/25 |
| 6,993,448 B2 | 1/2006 | Tracy et al. | |
| 7,085,808 B2 * | 8/2006 | Haverinen et al. | 709/203 |
| 7,152,105 B2 * | 12/2006 | McClure et al. | 709/224 |
| 7,284,062 B2 * | 10/2007 | Krantz et al. | 709/229 |
| 2001/0018710 A1 | 8/2001 | Clarke et al. | |
| 2001/0047407 A1 * | 11/2001 | Moore et al. | 709/223 |
| 2002/0046260 A1 | 4/2002 | Day, II | |
| 2002/0052876 A1 * | 5/2002 | Waters | 707/100 |
| 2002/0083343 A1 * | 6/2002 | Crosbie et al. | 713/201 |
| 2002/0161908 A1 * | 10/2002 | Benitez et al. | 709/231 |
| 2002/0174010 A1 * | 11/2002 | Rice, III | 705/14 |
| 2002/0188693 A1 * | 12/2002 | Simpson et al. | 709/217 |
| 2003/0005092 A1 * | 1/2003 | Nelson et al. | 709/220 |
| 2003/0065936 A1 * | 4/2003 | Wray | 713/200 |
| 2003/0086425 A1 * | 5/2003 | Bearden et al. | 370/392 |
| 2003/0182414 A1 * | 9/2003 | O'Neill | 709/223 |
| 2003/0212779 A1 | 11/2003 | Boyter et al. | |

(Continued)

OTHER PUBLICATIONS

Non-Final Office Action received in U.S. Appl. No. 10/683,564; Jul. 13, 2005.

(Continued)

*Primary Examiner* — Djenane Bayard
(74) *Attorney, Agent, or Firm* — Advantedge Law Group

(57) ABSTRACT

The present invention includes a method and system for scanning network devices connected to a network by detecting connection of a first network device to the network and performing remote scanning of the first network device in response to detection of the first network device.

25 Claims, 4 Drawing Sheets

U.S. PATENT DOCUMENTS

| | | | |
|---|---|---|---|
| 2004/0039827 A1* | 2/2004 | Thomas et al. | 709/228 |
| 2004/0193918 A1* | 9/2004 | Green et al. | 713/201 |
| 2004/0234056 A1* | 11/2004 | Heilmann et al. | 379/196 |
| 2004/0264435 A1 | 12/2004 | Chari et al. | |
| 2004/0268145 A1 | 12/2004 | Watkins et al. | |
| 2005/0015760 A1 | 1/2005 | Ivanov et al. | |
| 2005/0050335 A1* | 3/2005 | Liang et al. | 713/188 |
| 2005/0073982 A1* | 4/2005 | Corneille et al. | 370/338 |
| 2005/0204032 A1* | 9/2005 | Mirza-Baig | 709/224 |
| 2006/0010492 A9 | 1/2006 | Heintz | |
| 2007/0094378 A1* | 4/2007 | Baldwin et al. | 709/223 |
| 2007/0162965 A1* | 7/2007 | Carter et al. | 726/5 |
| 2007/0261121 A1* | 11/2007 | Jacobson | 726/26 |
| 2009/0320135 A1* | 12/2009 | Cavanaugh | 726/24 |

OTHER PUBLICATIONS

Non-Final Office Action received in U.S. Appl. No. 10/683,564; Jan. 9, 2006.

Final Office Action received in U.S. Appl. No. 10/683,564; Jun. 19, 2006.

Non-Final Office Action received in U.S. Appl. No. 10/683,564; Nov. 15, 2006.

Final Office Action received in U.S. Appl. No. 10/683,564; May 18, 2007.

Non-Final Office Action received in U.S. Appl. No. 10/683,564; Oct. 16, 2007.

* cited by examiner

METHOD AND SYSTEM FOR SCANNING NETWORK DEVICES

This application is a continuation of U.S. application Ser. No. 10/683,564, filed 10 Oct. 2003, the disclosure of which is incorporated in its entirety by this reference.

FIELD OF THE INVENTION

The present invention relates to scanning one or more network devices. More specifically, the present invention relates to performing scans of network devices upon detecting their connection to the network.

BACKGROUND OF THE INVENTION

The use of a computer to communicate over a network has become mainstream over the past decade. As a result, organizations and individuals typically rely on their networks to conduct business, communicate with others, and search for and retrieve data. In addition to helping businesses and individuals communicate and conduct business over a greater distance, the increased use of networks has also put computers at a greater risk. For example, the data stored on a computer communicating over a network such as the World Wide Web is vulnerable to viruses infecting the computer and destroying its data. Consequently, network security has become an item of paramount importance to organizations and individuals alike.

When configuring a network, a network security policy is often employed to ensure that each device communicating on the network is configured with specific and accepted security standards. For example, a corporation may have a security policy that states that all computers using the corporation's network must have a functioning virus scanner. This security policy may also specify the virus scanner that each device must have, such as by specifying that each device have Norton AntiVirus (manufactured by Symantec of Cupertino, Calif.).

As the number of devices communicating on the network increases, it usually becomes more difficult to make sure that each device communicating on the network meets the required security policy. Further, a breach in the security of the network may have a crippling effect, possibly resulting in down-time, computer repairs, and large costs to fix.

Traditionally, to lessen the risk of a security breach and ensure compliance with the security policy (e.g., having a functioning virus scanner), a security administrator or auditor uses a scanning application to scan a computer. The scanning application may be installed on each device communicating on the network to examine the device. This local scanning, however, introduces numerous problems. First, each individual device has the scanning application installed on the device. This may result in different devices having different versions of the scanning application. Moreover, the initiation of the scanning ordinarily occurs on the device itself. This may require a separate initiation sequence for each device. Further, the time required to deploy the scanning application on each device in the network is often too burdensome of a task to implement. Thus, local scanning is often too onerous to initiate and maintain.

Rather than using agent software to scan a device locally, a scanning application may instead periodically scan the networked computers remotely to locate any devices that do not follow the security policy. There are, however, numerous drawbacks associated with this scanning technique. One drawback is that the scan may not be comprehensive because some devices may have, for some reason, been turned off at the time of the scan and, consequently, may not have been scanned. Another shortcoming with periodic scanning is that there may be a significant delay between the time that a device attaches, or connects, to the network and the time that the scan occurs during the next scheduled scan. This time lag may result in a network being infected before a scan has occurred. Therefore, the periodic scanning, by its nature, does not enforce the security policy at all times.

A third weakness is that the periodic scan does not work well with computers that ordinarily connect to the network using transient means, such as with a virtual private network connection or using a wireless access point. In particular, the device may not be available at the time that the scan occurs because of the transient nature of the connection.

SUMMARY OF THE INVENTION

The present invention addresses the weaknesses of the scanning techniques described above and enables enforcement of a network security policy in a more robust and comprehensive manner. The present invention also increases scalability, coverage, and responsiveness of scanning while decreasing the implementation time. In one aspect, the invention includes a method for scanning network devices connected to a network by detecting connection of a first network device to the network and performing remote, agentless scanning of the first network device in response to detection of the first network device.

In one embodiment, the detecting module detects connection of the first network device by inspecting data packets communicated over the network. The detecting module can also detect connection of the first network device by querying a database. For example, the detecting module can continuously broadcast pings over the network, continuously examine address resolution protocol (ARP) tables, continuously monitor event logs, transmit a Lightweight Directory Access Protocol (LDAP) query (e.g., poll an LDAP server or execute a persistent LDAP search), and/or transmit a Domain Name System (DNS) query.

The method can also include determining whether the first network device is connecting to the network via wireless access, determining whether the first network device is connecting to the network via a Virtual Private Network (VPN), and/or determining whether the first network device is plugged into a wall socket.

In another embodiment, the remote agentless scanning step includes the steps of finding properties (e.g., credentials) associated with the first network device and determining the identity (e.g., type) of the first network device. Further, determining the identity of the first network device can include querying a database where the identity (e.g., type) has been determined, examining network traffic, analyzing network behavior, probing the first network device for signature responses, attempting to log into the device using a series of protocols, logging into the first network device and/or querying data within the device. In another embodiment, the remote agentless scanning also includes scanning, on the first network device, one or more of a configuration, a file, data, a software version, a patch, inventory, hardware, and/or a security vulnerability. The scanning step can also include updating one or more of these items, such as installing a software patch on the first network device. The scanning step can also include installing anti-virus software on the first network device and/or determining if the first network device is part of a windows domain.

In another embodiment, the method includes the step of comparing a security setting of the first network device with a predetermined security setting. In yet another embodiment, the method includes the step of enabling the first network device to have additional access to the network, denying the first network device some or all access to the network, notifying another (e.g., authorities) about the first network device based on results of the scan, and/or quarantining the first network device.

In another embodiment, the method also includes the steps of setting a security policy on the first network device, auditing the security policy of the first network device, ensuring compliance with a predetermined security policy, and/or reporting results (e.g., of a scan).

In another aspect, an apparatus for remote agentless scanning of network devices connected to a network includes a detecting module that detects connection of a first network device to the network and a scanning module that performs remote agentless scanning of the first network device in response to the detection of the first network device.

In one embodiment, the detecting module continuously polls a database for data corresponding to newly attached (connected) network devices. Further, the scanning module remotely scans the first network device upon detecting data corresponding to the first network device in the database. The apparatus can also include a history database to store scan results of a scan. In another embodiment, the scanning module can enable the first network device to have additional access to the network, can deny the first network device some or all access to the network, can notify another (e.g., authorities) about the first network device based on results of the scan, and/or can quarantine the first network device.

The apparatus can also include a security policy management module for setting a security policy on the first network device, auditing the security policy of the first network device, ensuring compliance with a predetermined security policy, and/or reporting results (e.g., of a scan).

In yet another aspect, a method for examining a first network device connected to a network includes querying a database for data representing connection of network devices to a network, determining connection of a first network device to the network by locating data about the first network device in the database, determining properties (e.g., credentials, identity) of the first network device, determining the items to scan based on the properties (e.g., based on the identity of the first network device), and performing remote scanning of the first network device in response to the determination of the connection of the first network device to the network.

In one embodiment, the properties of the first network device include credentials of the first network device and/or the identity of the first network device. The identity of the first network device can include the type of the first network device. In one embodiment, the network device's type can be determined by querying a database where the type has already been determined, by examining network traffic, by analyzing network behavior, by probing the first network device for signature responses, and/or by logging into and querying the first network device. Moreover, a set of security policy settings can be selected for an audit.

In yet another aspect, a method for scanning network devices connected to a network includes detecting connection of a first network device to the network and performing remote scanning of the first network device in response to detection of the first network device.

BRIEF DESCRIPTION OF THE DRAWINGS

The advantages of the invention described above, together with further advantages, may be better understood by referring to the following description taken in conjunction with the accompanying drawings. In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
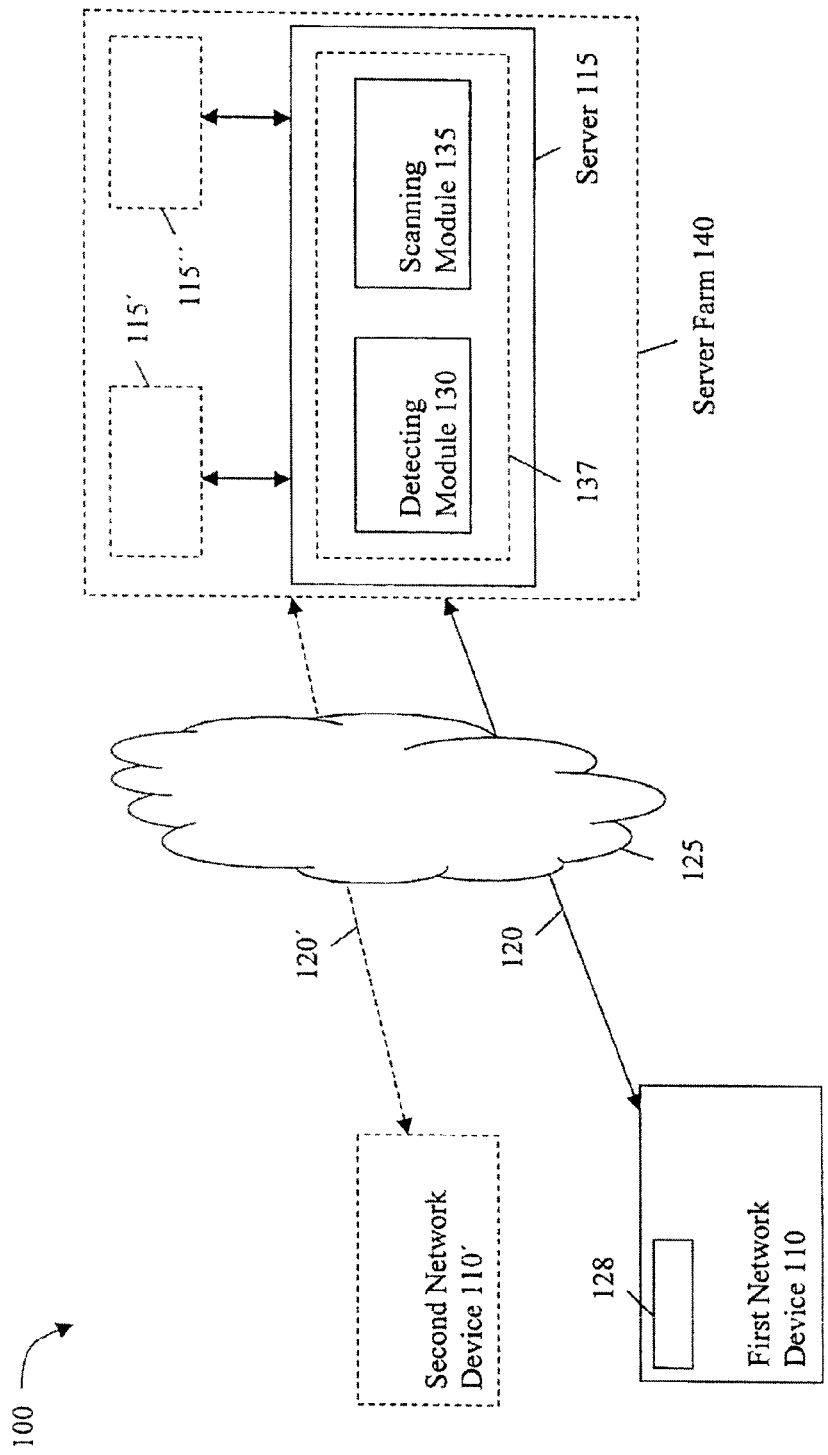
FIG. 1 is a block diagram of an embodiment of a security system having a detecting module and a scanning module constructed in accordance with the invention.

FIG. 1 illustrates a block diagram of an embodiment of a security system 100. The security system 100 includes a first network device 110 communicating with a server 115. The first network device 110 can be any personal computer, smart or dumb terminal, network computer, wireless device (e.g., cellular telephone or personal digital assistant), information appliance, workstation, minicomputer, mainframe computer or other computing device. The first network device 110 can also include a network infrastructure device, such as a router, switch, or firewall.

The first network device 110 is in communication with the server 115 over a first network device-server communication channel 120. Example embodiments of the communication channel 120 include standard telephone lines, LAN or WAN links (e.g., T1, T3, 56 kb, X.25), broadband connections (ISDN, Frame Relay, ATM), and wireless connections. The connections over the communication channel 120 can be established using a variety of communication protocols (e.g., HTTP, HTTPS, TCP/IP, IPX, SPX, NetBIOS, Ethernet, RS232, messaging application programming interface (MAPI) protocol, real-time streaming protocol (RTSP), real-time streaming protocol used for user datagram protocol scheme (RTSPU), the Progressive Networks Multimedia (PNM) protocol developed by RealNetworks, Inc. of Seattle, Wash., manufacturing message specification (MMS) protocol, and direct asynchronous connections).

In one embodiment, the first network device-server communication channel 120 is established over a network 125. Exemplary embodiments of the network 125 include the World Wide Web (i.e., "web"), the Internet, and a Virtual Private Network (VPN). In one embodiment, the first network device 110 includes a web browser 128, such as INTERNET EXPLORER developed by Microsoft Corporation of Redmond, Wash., to connect to the network 125. Moreover, the security system 100 can include any number of network devices, such as the first network device 110 and a second network device 110'. Although described above and below with respect to the first network device 110, the description also applies to the second network device 110'.

The server 115 can be any of the devices (e.g., wireless device, personal computer, etc.) described above for the first network device 110. The server 115 includes a detecting module 130 and a scanning module 135. Although shown as modules 130, 135 that are executing on the server 115, one or both of the modules 130, 135 may also execute on another device that is separate from the server 115. For example, the detecting module 130 can execute on another device (not shown) and communicate with the scanning module 135 on the server 115. In another embodiment, the detecting module 130 and the scanning module 135 are incorporated into a single software module, such as a network examining module 137.

The detecting module 130 and the scanning module 135 can be plug-in modules or stand-alone modules. Further, the detecting module 130 and/or the scanning module 135 can be downloaded to the server 115 over the web (e.g., from a web site), can be installed via portable means (e.g., disk, CD-ROM, etc.), can be received in an email (e.g., an email attachment), and the like.

The detecting module 130 detects connection of the first network device 110 to the network 125 when the first network device 110 connects to the network 125. In one embodiment, attachment (or connection) to the network 125 occurs when the first network device 110 communicates with any other device or node of the network 125. The scanning module 135 performs remote scanning of the first network device 110 in response to the detection of the first network device 110. In particular, the scanning module 135 performs remote, agent-less scanning of the first network device 110. Therefore, the scanning module 135 scans the first network device 110 without the use of software loaded on the first network device 110. The remote agentless scan can include a vulnerability scan and/or an audit scan. A vulnerability scan includes, for instance, a port scan and/or probing the first network device 110 against a large list of known vulnerabilities. An audit scan can include comparing current settings to a security policy or group of expected results. In one embodiment, the scanning module 135 takes an inventory of the first network device 110. For example, the scanning module 135 can determine which software is loaded onto or executing on the first network device 110, how frequently each software module or program executes or is accessed, the first network device's security policy, and the like.

In a further embodiment, the server 115 is a member of a server farm 140, or server network, which is a logical group of one or more servers that are administered as a single entity. In one embodiment, a server farm 140 includes multiple servers 115, 115', 115" (generally 115). Although the embodiment shown in FIG. 1 has three servers 115, the server farm 140 can have any number of servers. In other embodiments, the server farm 140 is a protected network that is inaccessible by unauthorized individuals, such as corporate Intranet, VPN, or secure extranet. Additionally, the servers 115 making up the server farm 140 may communicate over any of the networks described above (e.g., WAN, LAN) using any of the protocols discussed. Although described above and below as operating within a client-server network 125, the detecting module 130 and/or the scanning module 135 can alternatively be implemented in any type of network (e.g., peer-to-peer network).

Figure 2:
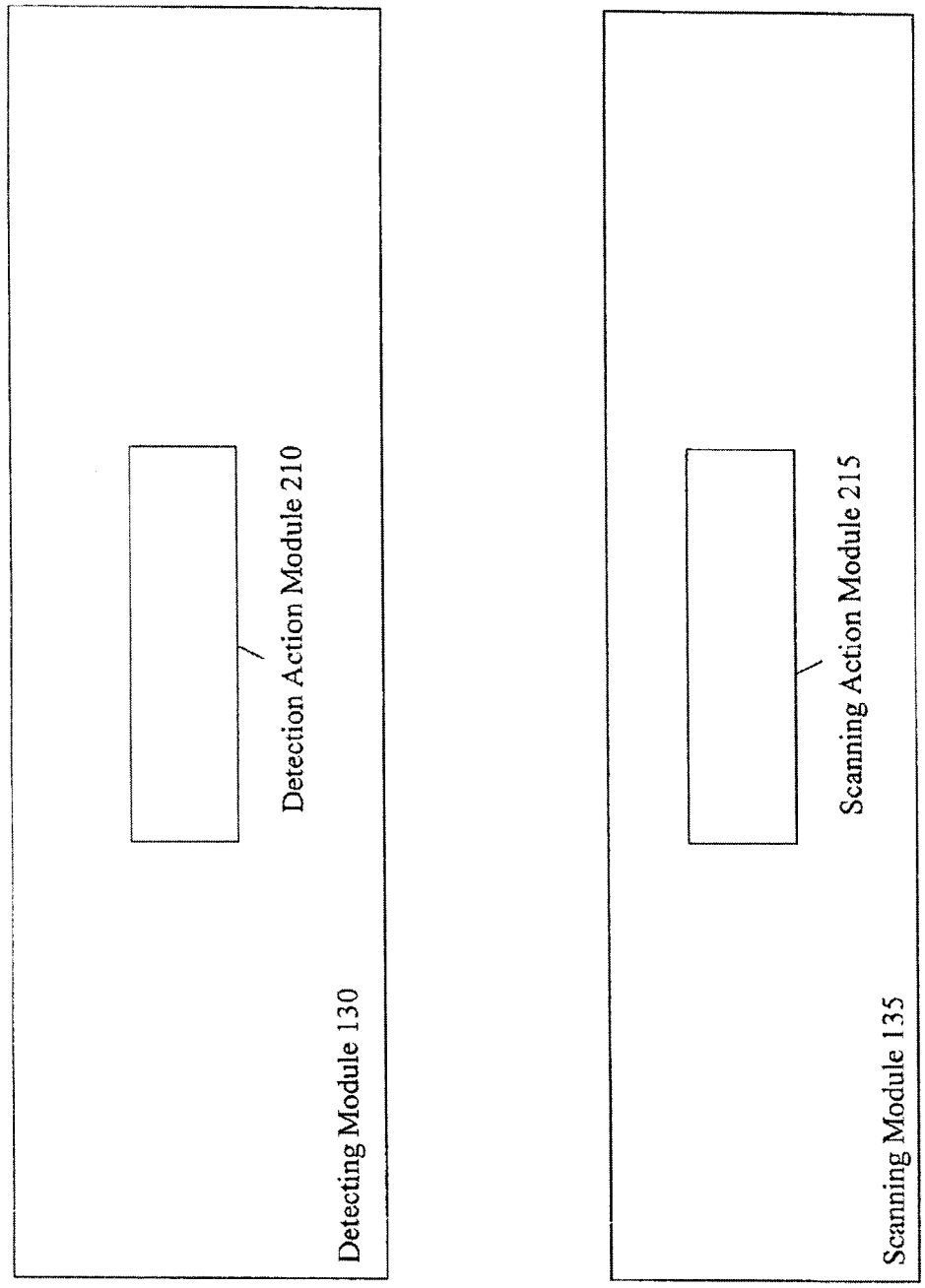
FIG. 2 is a more detailed block diagram of an embodiment of the detecting module and the scanning module of FIG. 1.

FIG. 2 shows a more detailed block diagram of the detecting module 130 and the scanning module 135. The detecting module 130 includes a detection action module 210 that performs one or more actions to detect when the first network device 110 attaches to the network 125. The scanning module 135 includes a scanning action module 215 that performs one or more actions upon the detection of the first network device's connection to the network 125.

To detect the first network device's connection to the network 125, the detection action module 210 can, for instance, continuously poll a database for data about connections to the network 125. In one embodiment, continuous polling of the database can be an unending repetition of checking the database at an extremely short frequency. In one embodiment, the first network device 110 registers with a database (e.g., a registration database) when the first network device 110 connects to the network 125. Registration includes, for instance, sending particular data (e.g., network address) about the first network device 110 to the registration database when the first network device 110 connects to the network 125. In one embodiment, the detection action module 210 continuously polls a LDAP server (e.g., a Directory System Agent (DSA)) in order to determine when the first network device 110 attaches to the network. In another embodiment, the registration database (e.g., on a DSA) is triggered (e.g., using a Structured Query Language trigger) when a new network device (e.g., the first network device 110) registers with the database. The detection action module 210 can communicate with the registration database when the database is triggered.

In another embodiment, the detection action module 210 can communicate with a browser service to detect when the first network device 110 connects to the network 125. In yet another embodiment, the detection action module 210 communicates with a DNS server to determine when the first network device 110 connects to the network 125. The detection action module 210 can also perform indirect queries, such as using an LDAP persistent search, to detect the first network device 110 when the device connects to the network 110.

When the detection action module 210 determines that the first network device 110 has connected to the network 125, the detection action module 210 notifies the scanning module 135 of the new attachment. The scanning module 135 then automatically and remotely scans the first network device 110 without using an agent (i.e., agentless).

The scanning module 135 can take an inventory of the first network device 110. In one embodiment, the scanning action module 215 scans the first network device 110 for all software programs loaded on and/or executing on the first network device 110. The scanning action module 215 can also scan the first network device 110 for particular software programs (e.g., programs loaded before a specific date, programs created by a particular developer, a specific virus (e.g., Blaster worm), etc.). Moreover, the scanning action module 215 can also interrogate the first network device 110 with a query about a particular item (e.g., program).

For example, the scanning module 135 can scan the first network device 110 for the latest patches, to determine if anti-virus software is installed, to determine whether firewall software is installed (and what kind), to determine if the first network device 110 belongs to an appropriate windows domain, and/or the privileges of the users of the first network device 110 (e.g., which users have administrative privileges). The scanning module 135 can also scan the first network device 110 to determine how the first network device 110 communicates with the network 125 and/or how the first network device 110 receives power (e.g., whether the first network device 110 is plugged into a wall socket (e.g., if the first network device 110 is a laptop), if the first network device 110 connects to the network 125 via a wireless access, or connects to the network 125 via a VPN).

The scanning module 135 can also perform maintenance, such as by fixing/updating software on the first network device 110. The scanning module 135 can perform these fixes automatically (e.g., periodically), as part of a manually invoked scan, or through a scheduled scan. With respect to the first network device's security policy, for example, the scanning module 135 can assign priority to items and fix individual items, groups of items, or global problems in the security policy. For example, the scanning module 135 can fix deviations in the security policy of the first network device 110 relative to a predetermined security policy. In another embodiment, the scanning module 135 applies a software patch to the first network device 110. The scanning module 135 can apply this patch automatically, can first notify the first network device 110 and wait for the device's response, can only notify the first network device 110 that the particular patch is needed to update the first network device's software, etc. Additionally, the scanning module 135 can also enable a rollback of the fix if the fix causes unexpected side effects.

The scanning module 135 can also detect anomalies. For example, if the first network device 110 is a server that always services requests from other devices, an anomaly occurs when the server begins making requests. If the scanning module 135 determines that this is occurring, the server is likely a security risk and/or infected with a virus. The scanning action module 215 can then perform one or more of the actions described above or below (e.g., quarantine the first network device 110, report the anomaly, ensure compliance with a security policy, etc.). Another example of an anomaly that warrants maintenance is if the first network device 110 maintains and has maintained (e.g., for years) a particular load (e.g., 5% load) and then unexpectedly maintains a load of approximately 95%. This load increase can be a sign of an infected device that may need to be quarantined or fixed.

In further embodiments, the scanning module 135 enables a user to view the scans (i.e., scan results) in real-time for substantially immediate feedback and early detection and response planning. Alternatively, the scanning module 135 saves scans to one or more files or databases for offline analysis and reporting. Moreover, the scanning module 135 can follow a schedule for the timing of its scans. The scanning module 135 can also scan the first network device 110 as the first network device 110 attaches to a quarantined network. The first network device 110 can then switch to the corporate network if the first network device 110 passes an agentless scan.

In one embodiment, the scanning module 135 archives the results of scans in a history database. The history database can be part of the scanning module 135 or may communicate with the scanning module 135. The scanning module 135 can also cache the type of device that the scanning module 135 scanned.

In some embodiments, the scanning module 135 quarantines (or enables quarantining of) software on the first network device 110. For example, if the scanning module 135 locates a particular virus within a program on the first network device 110, the scanning module 135 may quarantine the program having the virus or the first network device 110. The scanning module 135 can quarantine the program to enable subsequent analysis of the program, such as to enable the disinfecting of the program, in a "closed" environment (i.e., not connected to a network). Moreover, the quarantining of the software program having a virus bolsters security by further ensuring that the virus does not affect other network devices (e.g., the second network device 110') or other programs executing or loaded onto the first network device 110 (e.g., other user's software executing on the first network device 110). The scanning module 135 can also quarantine the first network device 110 that failed a scan by turning off the router port for the first network device 110 (e.g., at the switch). The scanning module 135 may also perform security functions for the first network device 110.

Although shown as separate modules 210, 215, the detection action module 210 and/or the scanning action module 215 can be incorporated into the detecting module 130 and/or the scanning module 135. Moreover, the scanning module 135 and the detecting module 130 can be incorporated into a single module.

Figure 3:
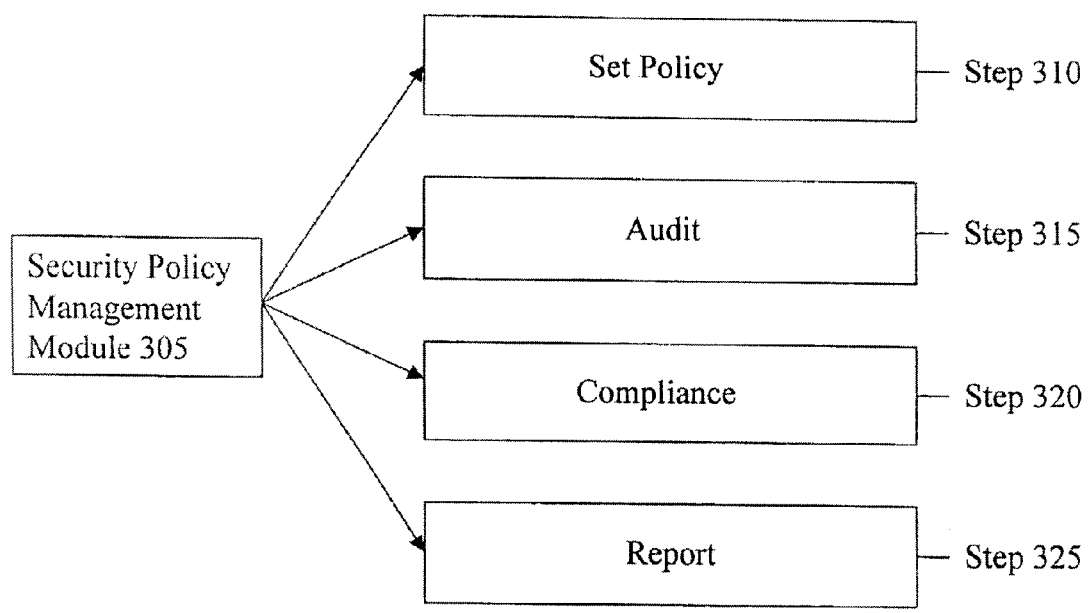
FIG. 3 is a block diagram illustrating an embodiment of a security policy management module.

In one embodiment and referring to FIG. 3, the scanning module 135 includes a security policy management module 305. The security policy management module 305 performs security policy management functions to the security policy of the first network device 110. For example, the security policy management module 305 can set the security policy of the first network device 110 (step 310). In one embodiment, the security policy management module 305 sets the first network device's security policy as a security policy that is an industry standard, such as, for example, a security policy developed by Microsoft Corporation of Redmond, Wash., System Administration, Networking, and Security (SANS) Institute, National Security Agency (NSA), National Institute of Standards and Technology (NIST), Center for Internet Security (CIS), and the Department of U.S. Navy. Additionally, the security policy management module 305 can also enable customization of the security policy. This customization can be, for instance, expression based.

The security policy management module 305 can also audit the security of the first network device 110 (step 315). In one embodiment, the auditing step includes a data collection process that gathers data from each device (e.g., the first network device 110) over the network 125. The security policy management module 305 stores the collected data in, e.g., a database. The amount of and type of data that the security policy management module 305 collects can vary depending on, for example, the function of the first network device 110 (e.g., if the first network device 110 is a web server, a database, a file server, etc.) and the platform of the first network device 110 (e.g., UNIX (developed by Bell Laboratories of Murray Hill, N.J.) or WindowsXP® (developed by Microsoft Corporation of Redmond, Wash.)).

In one embodiment, the security policy management module 305 enables multiple levels of settings, multiple patches (e.g., for applications and the operating system), software and/or hardware inventory, complete and/or sparse audits, and can also enable a user (e.g., an auditor) to view their rights and/or responsibilities. These rights/responsibilities are associated with the user's role and scope of the project. The rights/responsibilities can be associated with the first network device 110, specific security policy files, scanning, and the like. Moreover, the security policy management module 305 can also audit a group of devices (e.g., the first and second network devices 110, 110'), can fix security settings on the first network device 110 (or any number of additional network devices), and/or can audit on-demand or on a schedule.

The security policy management module 305 can also identify missing patches and identify unauthorized software (e.g., software with back doors), delete unlicensed or unauthorized software, identify unauthorized hardware (e.g., modems, wireless access points), eliminate unused system administration passwords on distributed systems, and/or provide control of external auditors' rights and responsibilities.

The security policy management module 305 can also automatically ensure that the first network device 110 complies with the requisite security policy (previously set) (step 320). For example, the security policy management module 305 can configure the first network device 110 with the correct security settings, can identify, manage, and/or update patches that the first network device 110 needs or has, and/or can add/delete software and/or hardware.

In more detail, the security policy management module 305 can verify and/or change, for instance, passwords, system level settings, users, groups, rights, account policies, key permissions, file permissions, registry settings, and/or weak passwords. Moreover, the security policy management module 305 can detect, for example, an operating system, software inventory, the version level of the software, hardware devices, and/or unauthorized modems. Additionally, the security policy management module 305 can be scalable to any device or enterprise and enables remote, agentless auditing and reporting. In other embodiments, the security policy management module 305 restores any or all system settings, files, or file attributes of the first network device 110.

The security policy management module 305 can also address additional security vulnerabilities of the first network device 110. Particular examples include assuring password compliance, discovering and configuring unauthorized modems, managing licensed software and revisions, and/or verifying virus detection software and updates.

The security policy management module 305 can also report the security policy information (step 325) or transmit the report to the first network device 110 (or any other device). The report can include detailed reports, such as reports with item-by-item and device-by-device listings, roll-up reports with device summaries for finding problem areas, executive summary reports with overall status reporting and high level charts, and trend reports that can be used to graph progress over time.

Although described above with a particular order (e.g., step 310, step 315, etc.), the functions that the security policy management module 305 performs can occur in any order and at any time. Further, these steps can be implemented in any of the modules (e.g., scanning module 135) described above and below.

Figure 4:
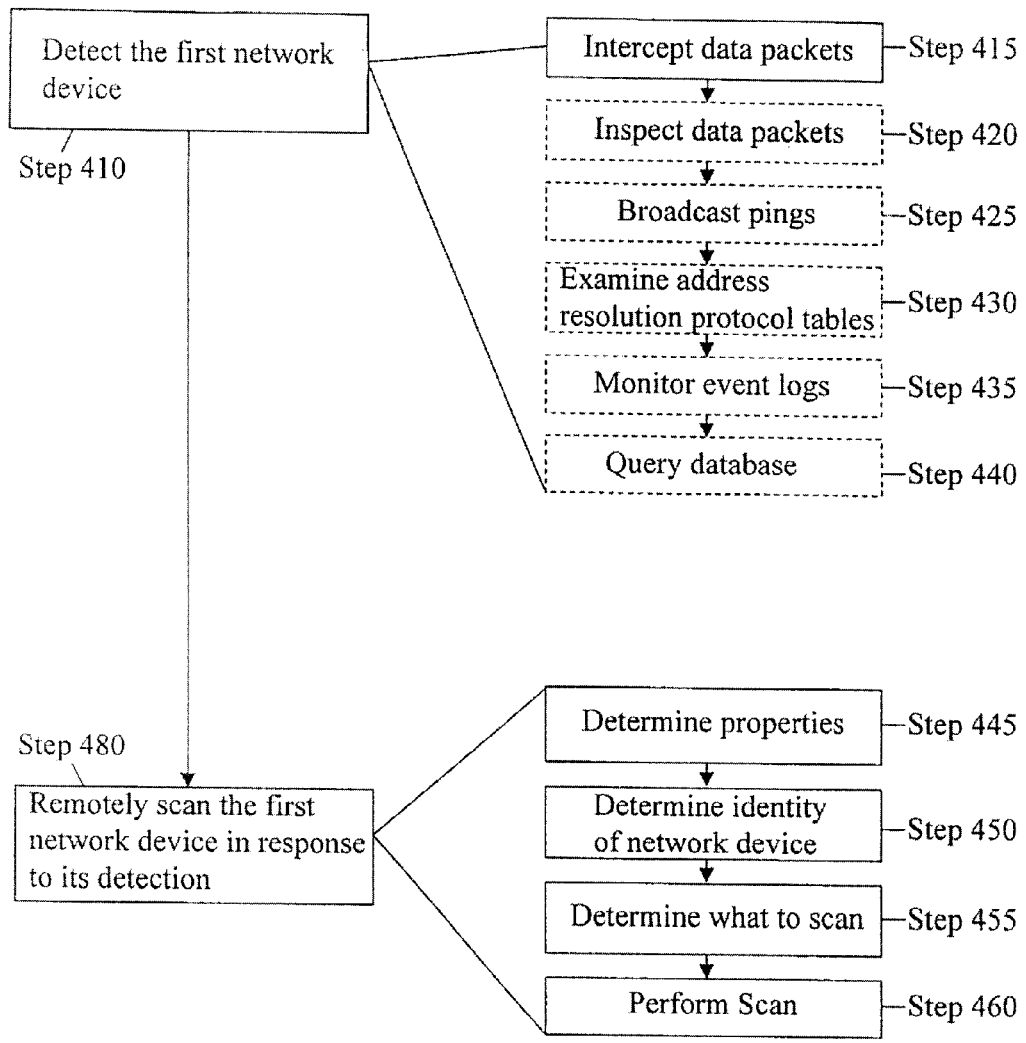
FIG. 4 is a flow diagram illustrating an embodiment of the steps performed by the detecting module and the scanning module of FIG. 1.

Referring to FIG. 4, the detecting module 130 detects the first network device 110 when the first network device 110 connects to the network 125 (step 410). In one embodiment, the detecting module 130 intercepts data packets transmitted by the first network device 110 to detect the first network device 110 (step 415). The detecting module 130 may also inspect data packets that are communicated over the network 125 for any data packets associated with the first network device 110 (step 420).

As part of the interception (step 415) and/or inspection (step 420) of data packets over the network 125, the detecting module 130 can perform one or more of a Network Basic Input/Output System (NetBios) broadcast, an ARP request or broadcast, a dynamic DNS registration, a Dynamic Host Configuration Protocol (DHCP) request, a Bootstrap Protocol (BOOTP) request, a Windows Domain Registration, a DNS query, and a "first packet seen" determination. The detection step 410 can also include port authentication.

The detection step 410 can also include continuous queries of, for example, a data source such as a database. These include broadcasting pings (step 425) to all network devices connected to the network 125 to detect any network devices that have not yet been detected, querying one or more ARP tables of one or more network communication devices (e.g., router and/or switch) to determine if an address associated with a new network device (e.g., the first network device 110) is located on the table (step 430), monitoring event log/syslog (step 435), a Simple Network Management Protocol (SNMP) query (e.g., to a router), LDAP query (e.g., to an Active Directory) (step 440), DNS query (step 440), switch port or Virtual Local Area Network (VLAN) status, and/or "sniffing" the network 125.

In response to detecting the first network device 110, the scanning module 135 remotely scans the first network device 110. In one embodiment, the detecting module 130 communicates the detection to the scanning module 135 upon the detection of the first network device 110.

To scan the first network device 110, the scanning module 135 can determine properties (e.g., credentials) associated with the first network device 110 (step 445) so that the scanning module 135 can perform the scan on the first network device 110. The properties can come from a database (e.g., a "credentials store"), or the properties of the process performing the scan may enable a scan. The properties can include, for instance, a user name and password to log into the first network device 110.

In one embodiment, the scanning module 135 then determines the identity (e.g., type) of the first network device 110 (step 450). The scanning module 135 determines the identity of the first network device 110 to determine the protocols and/or application program interfaces (APIs) to use in the scanning of the first network device 110. To determine the identity of the first network device 110, the scanning module 135 can query a database where the identity has already been determined (e.g., querying an Active Directory or Structured Query Language (SQL) Server), examine network traffic, analyze network behavior, probe the device 110 for "signature" responses (i.e., responses known to be unique to that type of device 110), and/or attempt to log into the first network device 110 using a series of protocols (e.g., Windows Networking Protocol (developed by Microsoft of Redmond, Wash.), Secure Shell (SSH) (developed by SSH Communications Security Ltd. of Palo Alto, Calif.), telnet, ftp, etc.). Once logged in, the scanning module 135 can query the first network device 110 for data, such as by looking for the presence of the file /etc/passwd to deduce a UNIX computer, or perform a Registry query on a Windows computer. Further, the determination of the properties of the first network device can also include the determining of the identity of the first network device 110 (i.e., steps 445 and 450 can be combined into a single step).

The scanning module 135 then determines what to scan (step 455). As described above and depending on the identity of device 110 and user preferences, the scanning module 135 can determine which policy settings to audit. For example, on a Microsoft Windows computer 110, the scanning module 135 may scan for missing Windows Hotfixes. On a Solarise computer (developed by Sun Microsystems, Inc. of Santa Clara, Calif.), the scanning module 135 can scan for missing Solaris® patches.

The scanning module 135 can also execute and/or remove software from the first network device 110 as part of its scan. The scanning module 135 can additionally compare security settings of the first network device 110 with predefined security settings to, e.g., ensure compliance with the predefined security settings. For instance, a template may be followed for a group security policy. In one embodiment, if the scanning module 135 determines that three settings in the first network device's policy are different than the template, the scanning module 135 may change the settings to match the template or may take another action as a result of the difference. Alternatively, the scanning module 135 reports the difference as a result of the comparison.

In some embodiments, the scanning module 135 enables the first network device 110 to have additional access to the network 125 or denies the first network device's access to the network 125. In one embodiment, enabling additional access to the network 125 includes enabling access to new areas of the network 125, such as if the network 125 is segmented by firewalls or filtering routers (e.g., it is in a limited quarantine). Further, the scanning module 135 may also notify another (e.g., the authorities) when data obtained from the scan poses a security threat. For example, the scanning module 135 can compare the scan results to a list of predetermined security terms and notify the authorities if a match is found.

In one embodiment, the scanning module 135 and/or the detecting module 130 can notify the customer (e.g., the user of the first network device 110) when a security setting changes. This notification can be with a phone call, e-mail, or directly with another software application. In another embodiment, the scanning module 135 is integrated into a software application's help desk software so that a help desk ticket is automatically opened when a failed scan occurs. The help desk ticket can result in a network administrator visiting the first network device 110 to interrogate the device 110. Although illustrated with particular steps (e.g., steps 415-460), the detecting module 130 and/or the scanning module 135 can perform any combination of these steps in any order.

Although the present invention has been described with reference to specific details, it is not intended that such details should be regarded as limitations upon the scope of the invention, except as and to the extent that they are included in the accompanying claims.

What is claimed is:

1. A method for scanning network devices connected to a network, comprising:
   (a) detecting when a first network device connects to the network at the time that the first network device connects to the network by polling a database about connections to the network and identifying the connection of the first network device to the network in response to the polling of the database; and
   (b) performing remote agentless scanning of the first network device in response to detecting when the first network device connects to the network by:
      taking an inventory of software and/or settings on the first network device;
      comparing the inventory to a security policy.

2. The method of claim 1, wherein polling the database comprises continuously checking the database at an extremely high frequency so that a response to the polling indicating connection of the first network device indicates when the first network device connected.

3. The method of claim 1, wherein polling the database about connections to the network comprises examining address resolution protocol tables.

4. The method of claim 1, wherein polling the database about connections to the network comprises continuously monitoring event logs.

5. The method of claim 1, wherein step (b) further comprises determining whether the first network device is plugged into a wall socket.

6. The method of claim 1, wherein the detecting is enabled by the first network device registering with the database when the first network device connects to the network.

7. The method of claim 1, wherein step (b) further comprises determining identity of the first network device by querying the database.

8. The method of claim 7, wherein the determining of the identity of the first network device further comprises querying a database where the identity has been determined.

9. The method of claim 1, wherein:
   the database resides on a lightweight directory access protocol server;
   polling the database about connections to the network comprises transmitting a lightweight directory access protocol query.

10. The method of claim 1, wherein:
    the database resides on a lightweight directory access protocol server;
    polling the database about connections to the network comprises executing a persistent lightweight directory access protocol search.

11. The method of claim 1, wherein detecting when the first network device connects to the network comprises:
    the database being triggered by the activating of a Structured Query Language trigger;
    a detecting module communicating with the database in response to the database triggering.

12. The method of claim 1, wherein comparing the inventory to the security policy comprises determining if the first network device is part of a WINDOWS domain.

13. The method of claim 1, wherein polling the database about connections to the network comprises transmitting a domain name system query.

14. The method of claim 1, further comprising:
    identifying a virus on the first network device during the remote agentless scan;
    quarantining the virus.

15. An apparatus for remote agentless scanning of network devices on a network comprising:
    (a) a detecting module that detects when a first network device connects to the network at the time that the first network device connects to the network by polling a database about connections to the network and identifying the connection of the first network device to the network in response to the polling of the database; and
    (b) a scanning module that performs remote agentless scanning of the first network device in response to detecting when the first network device connects to the network by:
       taking an inventory of software and/or settings on the first network device;
       comparing the inventory to a security policy.

16. The apparatus of claim 15, wherein:
    detection of the first network device is enabled by the first network device registering with the database when the first network device connects to the network.

17. The apparatus of claim 16, wherein the first network device registers with the database by sending a network address of the first network device to the database.

18. The apparatus of claim 15, wherein polling the database comprises communicating with a browser service to detect when the first network device connects to the network.

19. The apparatus of claim 15, wherein polling the database comprises performing an indirect query of the database.

20. The apparatus of claim 15, wherein the detection module attempts to detect connection of the first network device by:
    continuously broadcasting pings on the network;
    continuously examining address resolution protocol tables;
    continuously monitoring log events;
    transmitting a lightweight directory access protocol query; and
    transmitting a domain name system query.

21. A method for examining a first network device connected to a network, comprising:
    (a) querying a database for data representing connection of network devices to a network;
    (b) determining when a first network device connects to the network at the time that the first network device connects to the network by locating data about the first network device in the database in response to the querying of the database;

(c) determining properties associated with the first network device to determine the identity of the first network device;
(d) determining items to scan based on at least one of the properties; and
(e) performing remote scanning of the first network device to take an inventory of software and/or settings on the first network device in response to the determination of the connection of the first network device to the network.

22. The method of claim 21, wherein querying the database for data representing connection of network devices to a network comprises transmitting a lightweight directory access protocol query.

23. The method of claim 21, wherein querying the database for data representing connection of network devices to a network comprises transmitting a domain name system query.

24. The method of claim 21, wherein the determining is enabled by the first network device registering with the database when the first network device connects to the network.

25. A method for scanning network devices connected to a network, comprising:
(a) detecting when a first network device connects to the network at the time that the first network device connects to the network by continuously polling a database about connections to the network and identifying the connection of the first network device to the network in response to the polling of the database; and
(b) performing remote scanning of the first network device in response to detection of the first network device by:
taking an inventory of software and/or settings on the first network device;
comparing the inventory to a security policy.

* * * * *